(12) United States Patent
Nocon et al.

(10) Patent No.: US 10,951,736 B1
(45) Date of Patent: Mar. 16, 2021

(54) AUGMENTED REALITY (AR)-CAPABLE HEADSET AND VISUALLY DETECTED CONTROLLER DEVICES

(71) Applicant: Disney Enterprises, Inc., Burbank, CA (US)

(72) Inventors: Nathan D. Nocon, Valencia, CA (US); Jason A. Yeung, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/659,222

(22) Filed: Oct. 21, 2019

(51) Int. Cl.
*A63F 9/24* (2006.01)
*H04L 29/06* (2006.01)
*G02B 27/01* (2006.01)
*G06F 3/01* (2006.01)
*G06T 19/00* (2011.01)

(52) U.S. Cl.
CPC .............. *H04L 67/38* (2013.01); *G02B 27/01* (2013.01); *G06F 3/011* (2013.01); *G06T 19/006* (2013.01)

(58) Field of Classification Search
CPC ....... G06T 19/006; G06F 3/011; G02B 27/01; H04L 67/38
See application file for complete search history.

(56) References Cited

U.S. PATENT DOCUMENTS

| 10,354,651 | B1 * | 7/2019 | Yi | G10L 15/22 |
|---|---|---|---|---|
| 2014/0168264 | A1 * | 6/2014 | Harrison | G02B 27/0176 345/633 |
| 2016/0171771 | A1 * | 6/2016 | Pedrotti | G02B 27/017 345/633 |
| 2018/0322681 | A1 * | 11/2018 | Inomata | A63L 13/211 |
| 2020/0197822 | A1 * | 6/2020 | Horii | A63F 13/98 |

* cited by examiner

*Primary Examiner* — Steve Rowland
(74) *Attorney, Agent, or Firm* — Patterson + Sheridan, LLP (57) ABSTRACT

Aspects described herein include a system and associated AR-capable headset and method. The system includes one or more controller devices and an augmented reality (AR)-capable headset. The AR-capable headset includes one or more visual sensors and one or more computer processors that, while the headset is in an unworn state: receive input from the one or more controller devices, output visual content to an external display, and visually detect the one or more controller devices using the one or more visual sensors.

20 Claims, 9 Drawing Sheets

AUGMENTED REALITY (AR)-CAPABLE HEADSET AND VISUALLY DETECTED CONTROLLER DEVICES

BACKGROUND

The present disclosure generally relates to computer-based entertainment, and more specifically to augmented reality (AR)-capable devices and visually detected controller devices.

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

In one embodiment, a system comprises one or more controller devices, and an augmented reality (AR)-capable headset comprising one or more visual sensors and one or more computer processors configured to, while the headset is in an unworn state: receive input from the one or more controller devices; output visual content to an external display; and visually detect the one or more controller devices using the one or more visual sensors.

In another embodiment, an augmented reality (AR)-capable headset comprises one or more visual sensors, and one or more computer processors configured to: determine whether the headset is in an unworn state, wherein the headset has a substantially static orientation, and while the headset is in the unworn state: receive input from one or more controller devices, output visual content to an external display, and visually detect the one or more controller devices using the one or more visual sensors.

In another embodiment, a method for use with an augmented reality (AR)-capable headset comprises determining whether the headset is an unworn state, wherein the headset has a substantially static orientation. The method further comprises, while the headset is in the unworn state: receiving input from one or more controller devices, outputting visual content to an external display, and visually detecting the one or more controller devices using one or more visual sensors of the headset.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

An AR-capable headset may support a mixed reality experience, in which the headset displays visual content (e.g., graphics for a game application) overlaying a view of the physical environment. One or more visual sensors of the headset may visually track one or more controller devices that are hand-held or body-worn by a user. Input provided via the controller device(s) (e.g., tracked movement of the controller device(s), pressing button(s)) may be used to adapt the visual content. The headset often has minimal functionality when in an unworn state, e.g., the display is disabled while a battery of the headset is recharging. Further, the headset may not support integration with an external display (that is, external to the headset), such as a television (TV).

Embodiments described herein include an AR-capable headset comprising one or more visual sensors and one or more computer processors. The one or more computer processors are configured to determine whether the headset is in an unworn state, wherein the headset has a substantially static orientation. While the headset is in the unworn state, the one or more computer processors are further configured to receive input from one or more controller devices, output visual content to an external display, and visually detect the one or more controller devices using the one or more visual sensors. In some embodiments, a docking device arranges the headset with the substantially static orientation, and determining whether the headset is in an unworn state comprises determining whether the headset is docked with the docking device.

Thus, the headset supports multiple modes of user interaction, which may include displaying AR visual content in one or more modes while a user is wearing the headset, and displaying visual content in one or more other modes while a user is not wearing the headset. For example, the headset may display three-dimensional AR visual content in a first mode while the user is wearing the headset, and may in a second mode display visual content using an external display after the user removes the headset. While unworn, the headset may be capable of receiving input to adapt the visual content, e.g., one or more visual sensors of the headset may visually track the controller devices.

The headset may further support software applications that seamlessly transition visual presentation between the display included in the headset and one or more external displays. In one example, a game may require a user to wear the headset to view AR visual content related to a particular objective, then require the user to remove the headset for continued gameplay with the controller devices related to another objective. In another example, an application may display a movie to an external display while the headset is unworn, then continue the movie on an AR virtual display when the user dons the headset. Other applications that exploit the features of the headset will be apparent to one of ordinary skill in the art.

Although the headset is discussed primarily in terms of an AR capability, it will be noted that the AR-capable headset may have further capabilities. In some embodiments, the AR-capable headset may be operable in a virtual reality (VR) mode, which generally isolates a user wearing the AR-capable headset from their environment by replacing the natural field of view of the environment with virtual imagery.

Figure 1:
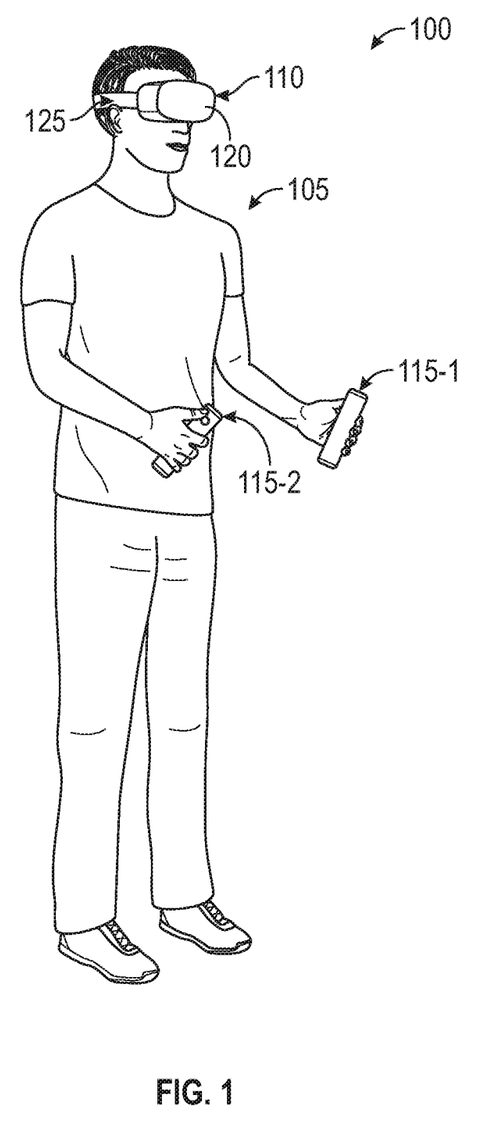
FIG. 1 illustrates exemplary operation of an AR-capable headset and visually detected controller devices, according to one or more embodiments.

FIG. 1 illustrates exemplary operation of an AR-capable headset 110 and visually detected controller devices 115-1, 115-2, according to one or more embodiments. In diagram 100, a user 105 wears the headset 110 on his/her head, and holds controller devices 115-1, 115-2 in his/her hands. The headset 110 comprises a lens 120 positioned in front of the eyes of the user 105, and a strap 125 attached to the lens 120 and configured to retain the headset 110 on the head of the user 105 in the desired position.

A display (not shown) of the headset 110 displays visual content that is viewed by the user 105. One or more computer processors (not shown) of the headset 110 may execute one or more applications that provide the visual content to be displayed by the display. One or more visual sensors (not shown) of the headset 110 acquire imagery of a portion of the physical environment surrounding the user 105. In some embodiments, the one or more visual sensors visually detect the controller devices 115-1, 115-2. The one or more computer processors may receive user input that may be used to interactively adapt the visual content. The user input may be received from the controller devices 115-1, 115-2, e.g., by the user moving the controller devices 115-1, 115-2 (whether visually detected by the one or more visual sensors, responsive to signals from sensors of the controller devices 115-1, 115-2, etc.), pressing buttons of the controller devices 115-1, 115-2, and so forth.

In some embodiments, the display, the one or more computer processors, and the one or more visual sensors are integrated into, and not removable from, the headset 110. However, in other embodiments, one or more of the display, the one or more computer processors, and the one or more visual sensors are removably attached to the headset 110.

Figure 2:
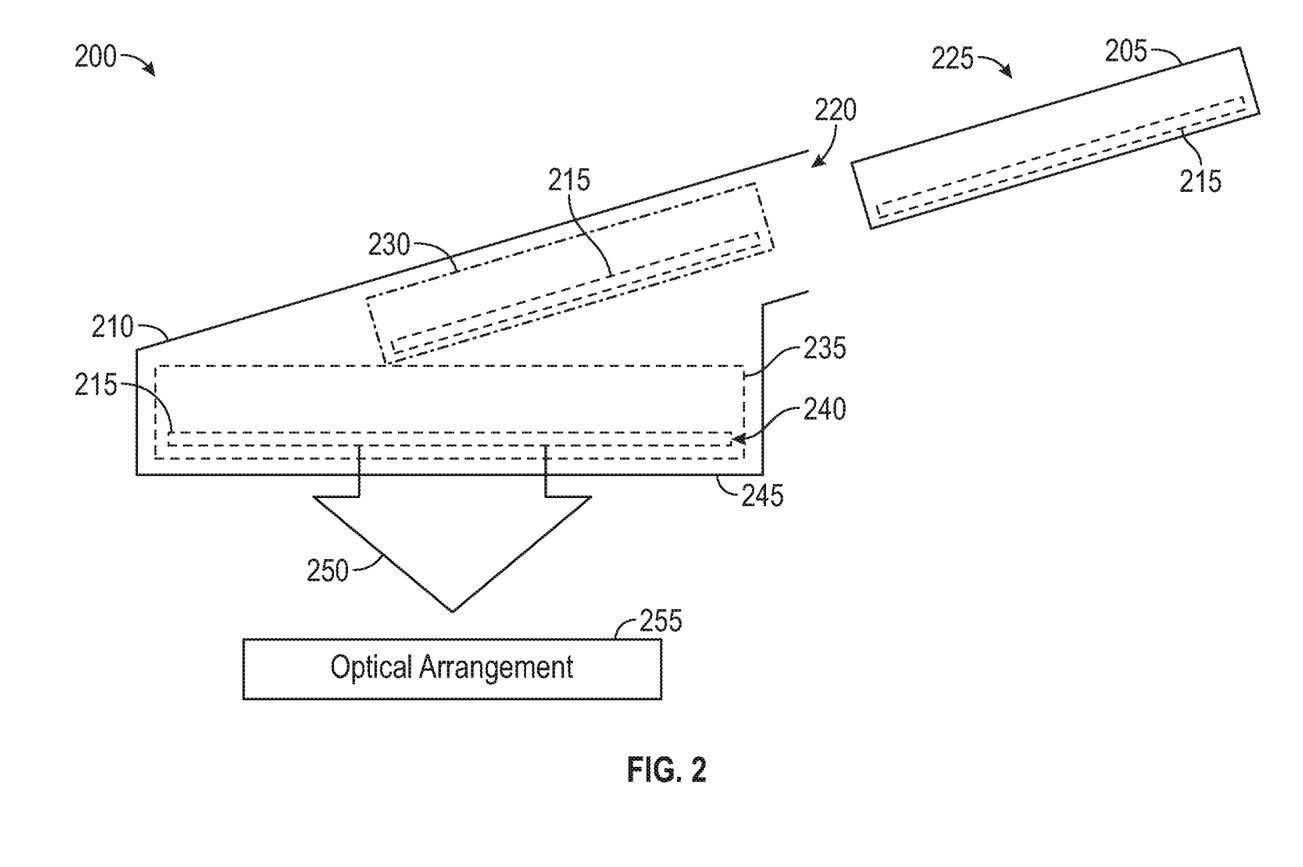
FIG. 2 is a diagram illustrating attachment of a mobile computing device with a mount assembly, according to one or more embodiments.

In the example shown in FIG. 2, a mobile computing device 205 is removably attached with a mount assembly 210, according to one or more embodiments. The features illustrated in the diagram 200 may be used in conjunction with other embodiments, e.g., the mount assembly may be integrated into the headset 110 of FIG. 1. The mobile computing device 205 may be implemented in any suitable form, such as a smartphone or a tablet computer. The mobile computing device 205 generally comprises one or more computer processors and a memory (not shown), and a display 215 using any suitable display technology.

The diagram 200 depicts an exemplary sequence for inserting the mobile computing device 205 into the mount assembly 210. The mount assembly 210 may be formed of one or more elements of any material having suitable strength for retaining the mobile computing device 205. In some embodiments, the mount assembly 210 is formed of a plastic material, which advantageously provides a lighter display device overall.

From a first position 225, the mobile computing device 205 is inserted through an opening 220 formed in the mount assembly 210. The intermediate position 230 represents a possible positioning of the mobile computing device 205 before reaching a predefined final position 235. At the predefined final position 235 of the mobile computing device 205, the display 215 of the mobile computing device 205 has a predefined position 240 relative to an optical arrangement 255.

A lower surface 245 of the mount assembly 210 is generally optically transmissive of light 250 generated by the display 215. In some embodiments, the lower surface 245 is formed of an optically transmissive material, such as a plastic or glass, through which the light 250 from the display 215 is transmitted. In other embodiments, the lower surface 245 defines an opening through which the light 250 from the display 215 is transmitted. For example, the lower surface 245 may support the mobile computing device 205 around a periphery of the mobile computing device 205.

Although not explicitly shown, the mount assembly 210 may include further elements for removably attaching the mobile computing device 205 with the mount assembly 210. For example, a press fit may be formed between the mobile computing device 205 and the mount assembly 210 using adjustable corner piece(s), a sliding tray with guide plug, toggle pin(s), a stepped slot, a replaceable tray, etc. For example, the mobile computing device 205 may be inserted into a replaceable tray or other suitable carrier member, which is then inserted to the mount assembly 210 to thereby arrange the display 215 with the predefined position 240. In this way, different carrier members may be used to accommodate different types of mobile computing devices 205 for a particular mount assembly 210.

The removable attachment of the mobile computing device 205 with the mount assembly 210 may have any suitable orientation within an associated display device. The elements of the optical arrangement 255 collectively define a field of view relative to predefined optical reference point(s), and the display device is generally designed such that the eye(s) of a user are aligned with the optical reference point(s). To support an AR capability of the display device, the mobile computing device 205 and mount assembly 210 are generally disposed outside of the field of view to allow a user to observe the physical environment through the optical arrangement 255. For example, for a head-worn display device in which a line of sight of the user corresponds to the field of view of the optical arrangement 255, the mobile computing device 205 and the mount assembly 210 may be positioned above, below, or to a side of the user's line of sight.

Although the display 215 is described in terms of being implemented in a mobile computing device 205, other implementations of the display 215 are also contemplated. In other embodiments, the display 215 and computing device may both be fully integrated into and not removable from the headset 110. In other embodiments, the mobile computing device 205 is separate from the display 215 that is fully integrated into the headset 110.

Figure 3:
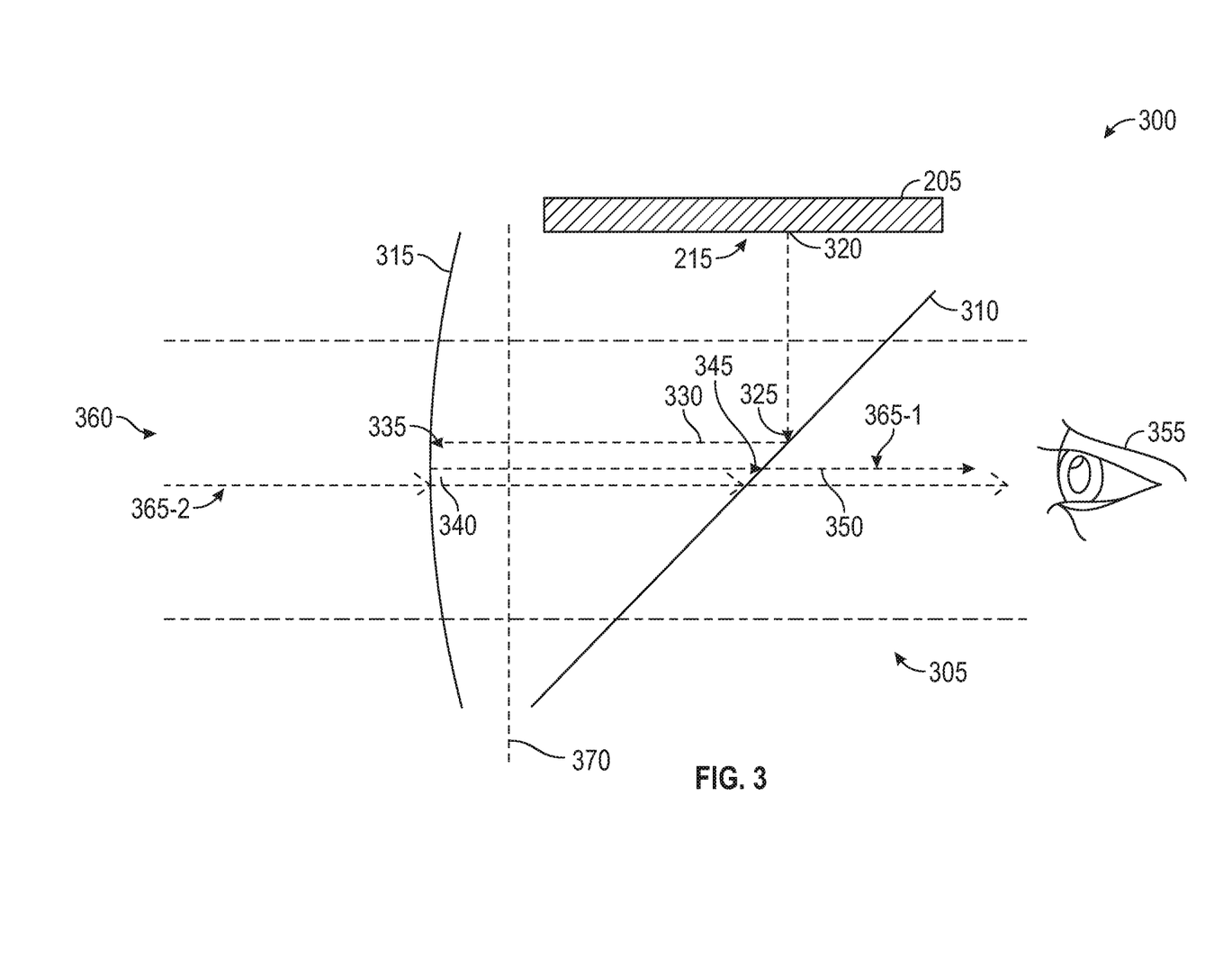
FIG. 3 illustrate an exemplary optical arrangement within a compact AR/VR display device, according to one or more embodiments.

FIG. 3 illustrates an exemplary implementation of a compact AR/VR display device 300, according to one embodiment. The features illustrated in FIG. 3 may be used in conjunction with other embodiments, e.g., integrated into the headset 110 of FIG. 1. More specifically, the display device 300 depicts an exemplary arrangement of the mobile computing device 205 and an optical arrangement 305 (one example of the optical arrangement 255 of FIG. 2) after placement of the mobile computing device 205 in the mount assembly 210 (e.g., as depicted in FIG. 2).

The optical arrangement 305 is configured to reflect at least a portion of light 320 from the display 215 to an eye 355 of a user. The elements of the optical arrangement 305 collectively define a field of view 360 relative to a predefined optical reference point. The display device 300 is generally designed such that the eye 355 of the user is aligned with the optical reference point, e.g., when worn by the user.

As shown, the mobile computing device 205 is arranged with the display 215 facing in a downward direction (that is, relative to the perspective of the user). However, alternate orientations of the display 215 relative to the user's perspective are also possible, such as upward-facing, sideways-facing, etc. The optical arrangement 305 defines a first optical path 365-1 that extends from the display 215 to a beam splitter element 310, from the beam splitter element 310 to a surface of a mirror element 315, and from the mirror element 315 through the beam splitter element 310 to the optical reference point. The optical arrangement 305 further defines a second optical path 365-2 extending from one or more objects in the environment through the mirror element 315 and through the beam splitter element 310 to the optical reference point.

As shown, the light 320 (or "imagery") that is generated by the display 215 is transmitted in the downward direction towards the beam splitter element 310. In some embodiments, the display 215 is a non-polarized display and the light 320 is non-polarized. In other embodiments, the display 215 is a polarized display and the light 320 is polarized.

Based on the light 320, a first incident light 325 is incident on the beam splitter element 310, and a first portion 330 of the first incident light 325 is reflected onto the field of view 360. In some embodiments, the beam splitter element 310 reflects approximately 50% of the first incident light 325 as the first portion 330 (e.g., where the beam splitter element 310 is implemented as a half-silvered mirror), and transmits approximately 50% of the first incident light 325 through the beam splitter element 310, although other ratios of reflection and transmission are also possible.

A second incident light 335 is incident on the mirror element 315, and a second portion 340 is reflected by the mirror element 315 toward the beam splitter element 310. The mirror element 315 may have any suitable reflection/transmission ratios for reflecting the second incident light 335 and transmitting light from the environment. In one embodiment, the mirror element 315 comprises a film (e.g., a coating or other reflective material applied to an inner curvature of the mirror element 315) that defines a partially reflective surface facing the beam splitter element 310. In some embodiments, the mirror element 315 reflects between about 50% and 80% of the second incident light 335 as the second portion 340, although other ratios of reflection and transmission are also possible. In one embodiment, the mirror element 315 reflects about 67% of the second incident light 335. A third incident light 345 is incident on the beam splitter element 310, and a third portion 350 is transmitted through the beam splitter element 310 to the optical reference point.

As mentioned above, in some embodiments the display 215 may be a polarized display and the light 320 is polarized. In some embodiments, the light 320 is linearly polarized (whether in s-polarization or p-polarization), and the beam splitter element 310 has a polarization axis that is rotated a net 90° from the polarization axis of the light 320. Here, because the light 320 has a polarization axis that is rotated from the polarization axis of the beam splitter element 310, the first portion 330 reflected by the polarized beam splitter element 310 comprises a majority (e.g., nearly all) of the first incident light 325.

Before reaching the mirror element 315, the first portion 330 passes through a quarter-wave plate element 370 (or "quarter-wave retarder"), which transforms the linear polarization of the first portion 330 into a circular polarization. The circularly polarized light is incident on the mirror element 315 as the second incident light 335, and the second portion 340 is reflected off the mirror element 315. The second portion 340 passes through the quarter-wave plate element 370, which transforms the circularly polarized light into linearly polarized light with a net 90°-rotated polarization from the polarization axis of the polarized beam splitter element 310. The third incident light 345 is incident on the beam splitter element 310, and the third portion 350 is transmitted by the beam splitter element 310. Because the polarization axis of the third incident light 345 and the polarization axis of the beam splitter element 310 are aligned, the third portion 350 comprises a majority of the third incident light 345. In this way, losses may be reduced at each incidence of the light on the beam splitter element 310.

Such an implementation may also increase the amount of light from background objects that is transmitted through the mirror element 315 and the beam splitter element 310 to the user's eye 355. When light from background objects passes through a polarized surface of the mirror element 315 (e.g., a chemical film applied to the mirror element 315), the light becomes linearly polarized and the quarter-wave plate element 370 transforms the polarization of this light so that a larger percentage passes through the beam splitter element 310. The net effect of adding the polarizing reflective surface to the mirror element 315, in combination with the quarter-wave plate element 370, is to significantly increase the amount of light that reaches the user's eye 355, including the light 320 emitted from the display 215 and light from the background objects viewed through the optics of the optical arrangement 305.

Although not shown, the optical arrangement 305 may further include a mask that is configured to block light from some of the display area of the display 215 and/or from other portions of the mobile computing device 205 to prevent these portions from being seen by the user. For example, a mask may be provided to prevent edges of the mobile computing device 205 from being visible within the field of view 360, which tends to distract the user from the immersive nature of the interactive environment.

Although not shown, the optical arrangement 305 may further include a light-blocking assembly disposed within the field of view 360. In some embodiments, the light-blocking assembly comprises cross polarizers. When one or both of the cross polarizers are rotated, the amount of light from the physical environment that is transmitted to the user's eyes (e.g., through the beam splitter element 310) can be controlled to substantially isolate the field of view 360 from the physical environment (e.g., corresponding to a selected VR mode). Stated another way, the light-blocking assembly may be used to selectively isolate the second optical path 365-2. Rotating the cross polarizers may be performed manually (e.g., the user turns a knob linked with the cross polarizers) or electronically. For example, a motor linked with the cross polarizers receives control signals from an associated computing device (such as the mobile computing device 205) and rotates the cross polarizers based on a selected AR or VR display mode. In other embodiments, the light-blocking assembly includes a partially or fully transmissive "see-through" display, such as an OLED or a side-lit or naturally-lit LCD. In this case, the partially or fully transmissive display receives control signals from the associated computing device and selectively darkens the display based on the selected AR or VR display mode.

Although not shown, a camera included in the mobile computing device 205 may be used as a visual sensor of the headset 110 of FIG. 1. For example, the camera may be included on an opposite surface from the display 215. In some embodiments, the display device 300 may further include a second mirror element configured to reorient a sensing axis of the camera. In some embodiments, the camera senses in the forward direction corresponding to an axis of the field of view 360. In this orientation, the camera is able to acquire visual information for the environment for performing optical detection and tracking, depth estimation, and so forth. The second mirror element can be as simple as a single 90° fold mirror, or can be more complex including multiple mirrors and/or different mirror curvatures. In another implementation, the camera of the mobile computing device 205 may be included on the same surface as the display 215.

Figure 4:
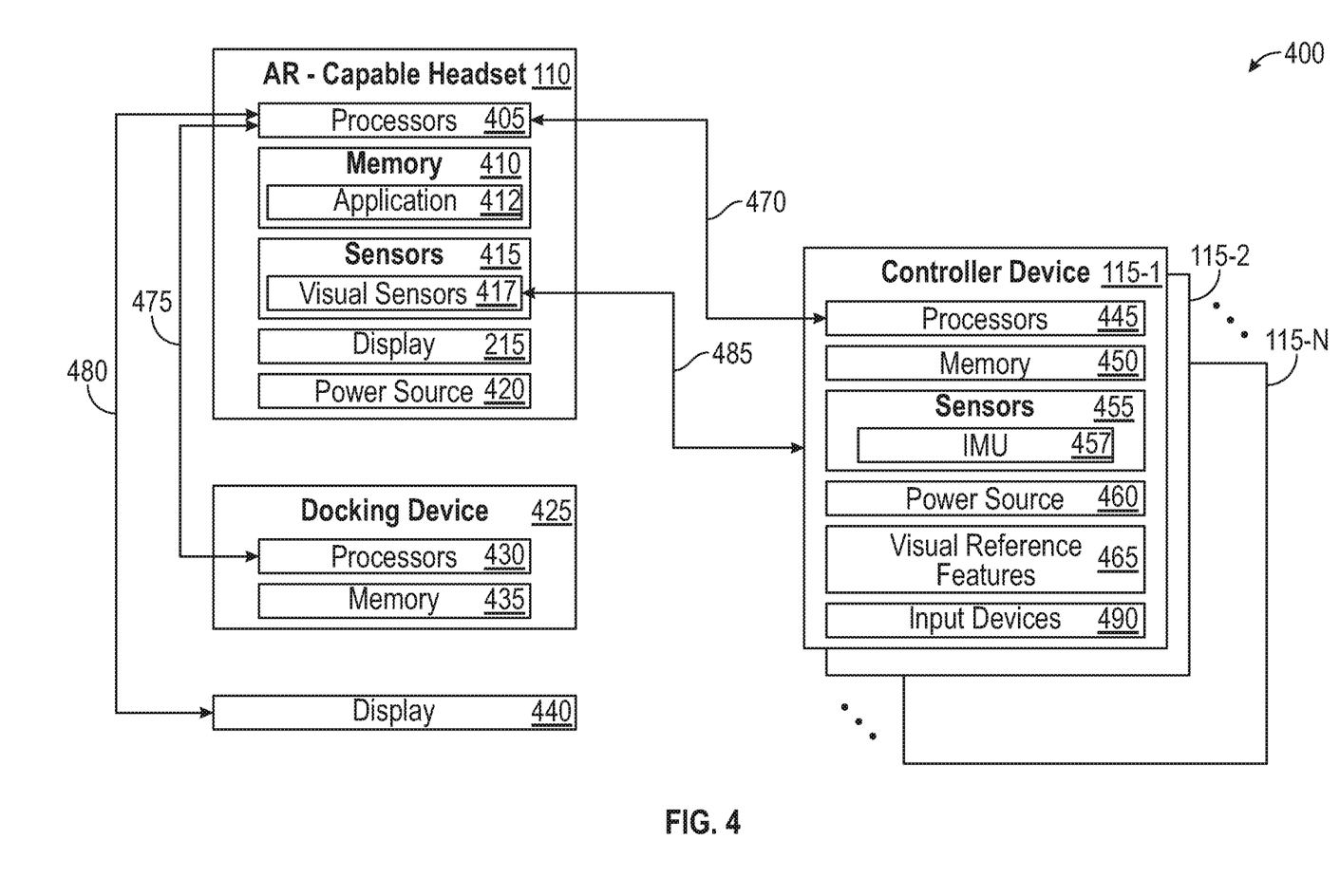
FIG. 4 is a block diagram of an exemplary system, according to one or more embodiments.

FIG. 4 is a block diagram of an exemplary system 400, according to one or more embodiments. The features illustrated in the system 400 may be used in conjunction with other embodiments.

The headset 110 comprises one or more computer processors 405 and a memory 410. The one or more computer processors 405 may be implemented in any suitable form, such as a general purpose microprocessor, a controller, an application-specific integrated circuit (ASIC), and so forth. The memory 410 may include a variety of computer-readable media selected for their size, relative performance, or other capabilities: volatile and/or non-volatile media, removable and/or non-removable media, etc.

The memory 410 may include one or more applications (or modules) for performing various functions described herein. In one embodiment, each application includes program code that is executable by the one or more computer processors 405. However, other embodiments may include modules that are partially or fully implemented in hardware (i.e., circuitry) or firmware of the headset 110. As shown, the memory 410 comprises an application 412 that generates visual content to be displayed based on the state of the headset 110 (e.g., worn or unworn, docked, etc.), input received from controller devices 115-1, 115-2, . . . , 115-N, and so forth. For example, the application 412 may be implemented as a game providing a dynamic gameplay environment for one or more users, and may have any suitable form such as an action game, an adventure game, a role-playing game, a simulation game, a strategy game, a sports game, a party game, a trivia game, an educational game, and so forth. In another example, the application 412 may be implemented as a streaming media application.

The headset 110 further comprises one or more sensors 415 communicatively coupled with the one or more computer processors 405. Sensor signals from the one or more sensors 415 may be used as input by the one or more computer processors 405 to determine the state of the headset 110, to interactively adapt the visual content, and so forth. The one or more sensors 415 may be implemented in any form. In some embodiments, the one or more sensors 415 comprise one or more visual sensors 417. The one or more visual sensors 417 may have any suitable implementation, such as a visual camera or an infrared camera. For example, the one or more visual sensors 417 may comprise a camera having a forward-oriented field of view when the headset 110 is in a worn state. In some embodiments, the one or more sensors 415 further comprise a worn-state sensor indicating whether the headset 110 is being worn. Some examples of the worn-state sensor include a sensor that detects contact with a user's face, a photodetector that receives light from an LED when the headset 110 is not being worn (e.g., the user's face is not blocking the path between the LED and photodetector), and so forth. Other types of sensors are also contemplated for the one or more sensors 415, such as a navigation system (e.g., a Global Positioning System receiver), an inertial measurement unit (IMU), and so forth.

The headset 110 further comprises a display 215 communicatively coupled with the one or more computer processors 405. The display 215 may include any type of dynamic display capable of displaying a visual interface to a user of the headset 110. Some non-limiting examples of suitable display technologies include any type of light emitting diode (LED), organic LED (OLED), liquid crystal display (LCD), plasma, and electroluminescence (EL). As discussed above, the display 215 may be integrated into the headset 110, may be detachable from the headset 110, may be integrated into a mobile computing device, and so forth.

The headset 110 further comprises a power source 420 that provides electrical power to components of the headset 110. The power source 420 may be implemented in any suitable form, such as a rechargeable or replaceable battery. In some embodiments, the power source 420 is a rechargeable battery that may be recharged via a conductive connection or via a wireless connection (e.g., inductive charging).

The system 400 further comprises one or more controller devices 115-1, 115-2, . . . , 115-N (generically referred to as controller device(s) 115). The controller devices 115 may have any suitable implementation. In some embodiments, the one or more controller devices 115 are hand-held or body-worn. For example, a controller device 115 may be worn as a glove on a user's hand, as a band or sleeve on a user's arm, and so forth. Other modes of holding or wearing the controller devices 115 are also contemplated.

Each controller device 115 comprises one or more computer processors 445, a memory 450, one or more sensors 455, and a power source 460. The one or more computer processors 445 may be implemented in any suitable form. The memory 450 may include a variety of computer-readable media selected for their size, relative performance, or other capabilities. The one or more sensors 455 are communicatively coupled with the one or more computer processors 445. In some embodiments, the one or more sensors 455 comprises an IMU 457, which may include one or more of an accelerometer, a gyroscope, and a magnetometer that acquire orientation data and/or movement data of the controller device 115. Other types of sensors are also contemplated.

Each controller device 115 further comprises a power source 460 that provides electrical power to components of the controller device 115. The power source 460 may be implemented in any suitable form, such as a rechargeable or replaceable battery.

In some embodiments, each controller device 115 comprises one or more visual reference features 465 arranged on one or more external surfaces of the controller device 115. The one or more visual reference features 465 may be disposed on the external surface, or may be disposed within the controller device 115 and visible at the external surface (e.g., light that is transmitted through an optically permissive external surface, light that is transmitted through an opening formed in the external surface).

In some embodiments, the one or more visual reference features 465 comprise one or more passive visual indicators that are not electrically powered, and/or one or more active visual indicators that are electrically powered. Some non-limiting examples of the one or more passive visual indicators include fiducials or other distinct features or markings at the external surface. The one or more passive visual indicators may be formed in the external surface and/or attached thereto (e.g., a sticker applied to the external surface).

One non-limiting example of the one or more active visual indicators includes light emitting diodes (LEDs) that emit light in the visible spectrum or infrared spectrum. In some embodiments, the one or more computer processors 445 control the visual appearance (e.g., arrangement, color) of the one or more active visual indicators to visually distinguish the controller device 115. In some embodiments, the visual appearance of the one or more active visual indicators is controlled based on detecting a presence of other controller devices 115. For example, the color(s) of the one or more active visual indicators may be selected as different colors to visually distinguish the different controller devices 115.

In some embodiments, each controller device 115 further comprises one or more input devices 490 communicatively coupled with the one or more computer processors 445. The one or more input devices 490 receive user input during operation of the controller device 115, which may be communicated by the controller device 115 to interactively adapt visual content displayed by the headset 110. The one or more input devices 490 may be implemented in any suitable form, such as buttons, switches, triggers, touch sensors, and so forth.

The one or more computer processors 445 of the controller device 115 are communicatively coupled with the one or more computer processors 405 of the headset 110 via a communicative connection 470. The communicative connection 470 may be implemented in any suitable form, such as wireline, wireless, optical, etc. In some embodiments, the communicative connection 470 may differ based on an operational state of the headset 110. In one example, while the headset 110 is in a worn state or in an unworn state (e.g., a docked state), and the controller device 115 is held by the user, the communicative connection 470 may be wireless. In another example, while the headset 110 is in an unworn state (e.g., in a docked state) and the controller device 115 is not held by the user (e.g., in a docked state), the communicative connection 470 may be wireless or wired.

The one or more visual sensors 417 of the headset 110 have a communicative connection 485 with the controller devices 115. Stated another way, the one or more visual sensors 417 visually detect the controller devices 115 when the headset 110 is in a worn state and when the headset 110 is in an unworn state. The one or more computer processors 405 may perform image processing to identify positioning and/or motion of the controller devices 115. In some embodiments, visual detecting the controller devices 115 comprises detecting the one or more visual reference features 465.

In some embodiments, when the headset 110 is in a docked state (e.g., an unworn state in which the headset 110 has a substantially static orientation), the headset 110 visually detects the controller devices 115 using the one or more visual sensors 417. Stated another way, when the headset 110 is in the substantially static orientation, the one or more visual sensors 417 are arranged to visually detect the controller devices 115.

The headset 110 may physically couple with a docking device 425. In some embodiments, the docking device 425 arranges the headset 110 with the substantially static orientation. The docking device 425 may be implemented in any suitable form. For example, the docking device 425 may define an exterior surface on which the headset 110 may be removably placed. In some embodiments, the docking device 425 may include one or more features that mate or otherwise engage with one or more features of the headset 110. In some embodiments, the docking device 425 may retain the headset 110 to maintain the substantially static orientation.

The headset 110 may communicatively couple with the docking device 425. In some embodiments, the docking device 425 comprises one or more computer processors 430 and a memory 435, which may be implemented in any suitable form. For example, the one or more computer processors 430 may comprise a graphics processing unit (GPU). In some embodiments, the one or more computer processors 405 of the headset 110 are communicatively coupled with the one or more computer processors 430 via a communicative connection 475. The communicative connection 475 may be implemented in any suitable form, such as wireline, wireless, optical, etc.

In some embodiments, the one or more computer processors 405 identify whether the headset 110 is in a docked state or not using the communicative connection 475. In one example, the one or more computer processors 405 may identify the docked state by detecting a presence of the communicative connection 475 with the docking device 425. In another example, the one or more computer processors 405 may identify the docked state by detecting identification information of the docking device 425 (e.g., an identifier stored in the memory 435).

In some embodiments, the docking device 425 comprises one or more connectors that physically engage with one or more connectors of the headset 110 when the headset 110 is in the docked state. In some embodiments, the docking device 425 comprises circuitry that wirelessly couples with circuitry of the headset 110 when the headset 110 is in the docked state.

In some embodiments, the docking device 425 includes external connectivity that is not included in the headset 110, such that the connectivity of the headset 110 may be expanded when the one or more computer processors 405 are communicatively coupled with the one or more computer processors 430. For example, the docking device 425 may include one or more connectors to connect to an external display, to external input devices, and so forth.

In some embodiments, the computing resources of the docking device 425 may be utilized by the headset 110. In some embodiments, the application 412 may offload some of its computing tasks to be performed by the one or more computer processors 430. In other embodiments, computing tasks of the application 412 are processed in parallel by the one or more computer processors 405 and the one or more computer processors 430. In some embodiments, additional features of the application 412 may be enabled using the computing resources of the docking device 425. For example, the one or more computer processors 430 may allow the application 412 to output visual content with enhanced graphics.

In some embodiments, the docking device 425 delivers electrical power to the headset 110 when the headset 110 is in the docked state. The electrical power may be used to charge the power source 420 of the headset 110. For example, the docking device 425 may comprise one or more conductive connections and/or one or more wireless connections (e.g., an induction coil for inductive charging) for delivering the electrical power. In other embodiments, the headset 110 in the docked state receives electrical power from another source, such as wall power.

In some embodiments, one or more controller devices 115 may dock directly and/or indirectly with the docking device 425. When in a docked state, the one or more controller devices 115 may receive electrical power to charge the respective power source 460. In one example, the one or more controller devices 115 may mate or otherwise engage directly with the docking device 425. In another example, the one or more controller devices 115 may mate or otherwise engage with the headset 110 when the headset 110 is in an unworn state, and may be indirectly docked with the docking device 425 when the headset 110 is docked with the docking device 425.

The one or more computer processors 405 may be communicatively coupled with an external display 440 via a communicative connection 480. The external display 440 may have any suitable implementation using any suitable display technology, such as LED, OLED, LCD, plasma, EL, and so forth. The communicative connection 480 may be implemented in any suitable form, such as wireline, wireless, optical, etc. In some embodiments, the one or more computer processors 405 output visual content to the display 215 when the headset 110 is in a worn state, and output visual content to the external display 440 when the headset 110 is in an unworn state (e.g., a docked state). The one or more computer processors 405 may be communicatively coupled with the external display 440 directly or indirectly (e.g., via the docking device 425).

Figure 5:
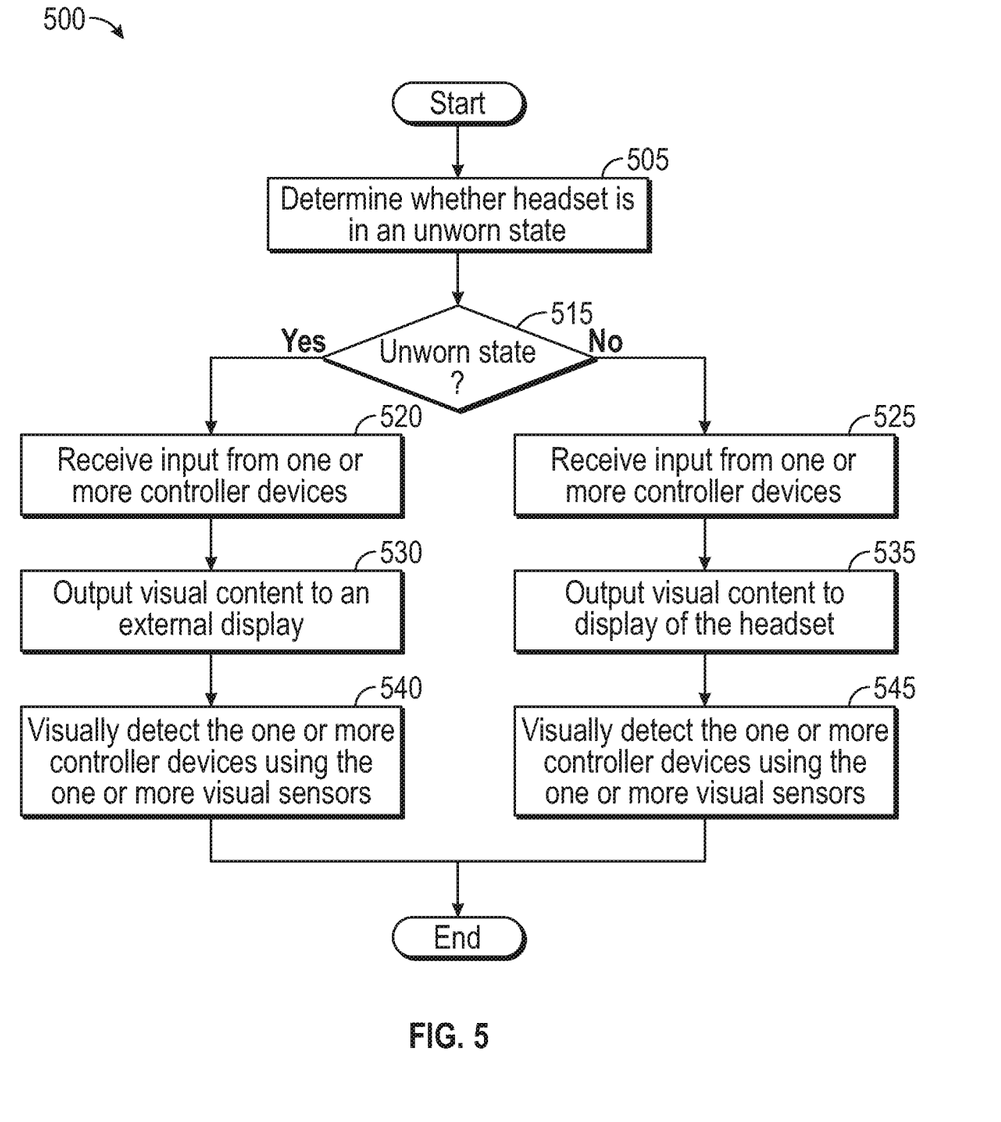
FIG. 5 is an exemplary method of operating an AR-capable headset, according to one or more embodiments.

FIG. 5 is an exemplary method 500 of operating an AR-capable headset, according to one or more embodiments. The method 500 may be performed in conjunction with other embodiments, such as being performed using one or more computer processors of the headset 110 illustrated in FIGS. 1 and 4.

The method 500 begins at block 505, where the one or more computer processors determine whether the headset is in an unworn state. In some embodiments, determining whether the headset is in an unworn state is based on one or more sensor signals.

At block 515, when the headset is in an unworn state ("YES"), the method 500 proceeds to block 520, where the one or more computer processors receive input from one or more controller devices. At block 530, the one or more computer processors output visual content to an external display. At block 540, the one or more computer processors visually detect the one or more controller devices using the one or more visual sensors.

At block 515, when the headset is not in an unworn state ("NO"), the method 500 proceeds to block 525, where the one or more computer processors receive input from the one or more controller devices. At block 535, the one or more computer processors output visual content to a display of the headset. At block 545, the one or more computer processors visually detect the one or more controller devices using the one or more visual sensors. The method 500 ends following completion of one of block 540 or block 545.

Figure 6A:
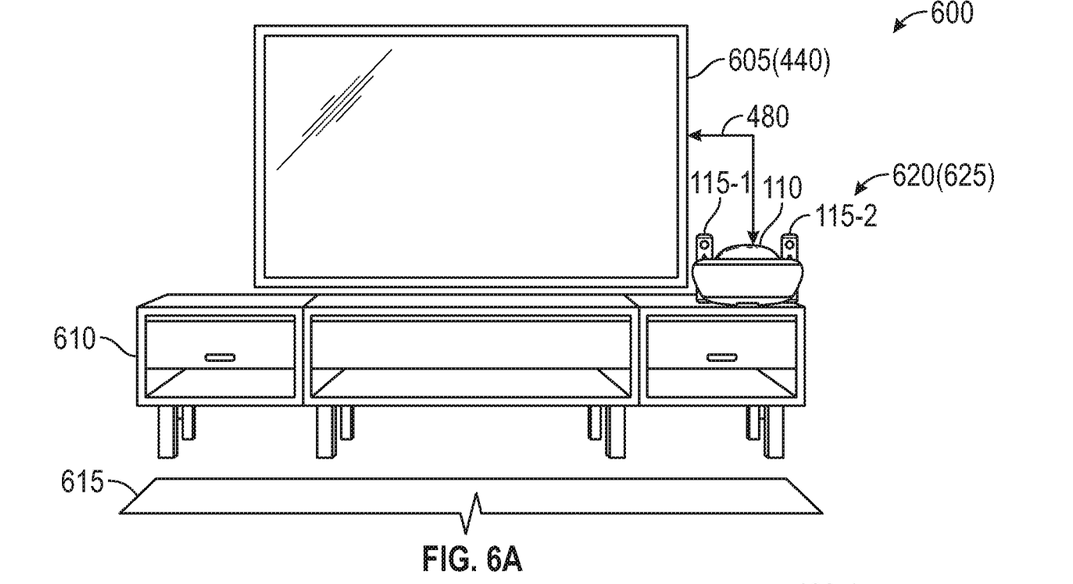
FIG. 6A illustrates an exemplary docked state of an AR-capable headset, according to one or more embodiments.
Figure 6B:
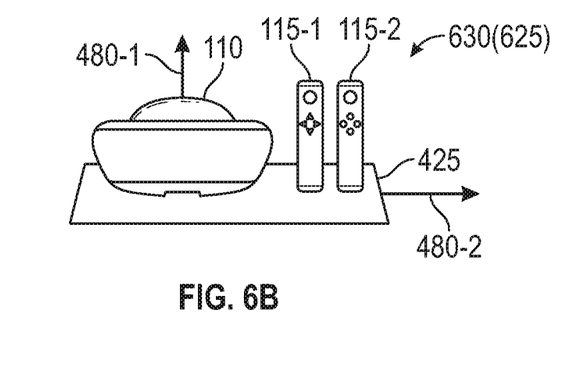
FIG. 6B illustrates an exemplary docked state of an AR-capable headset, according to one or more embodiments.
Figure 6C:
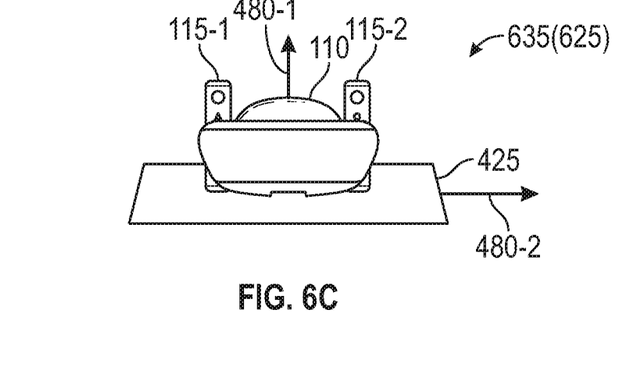
FIG. 6C illustrates an exemplary docked state of an AR-capable headset, according to one or more embodiments.

FIGS. 6A-6C illustrate exemplary docked states of an AR-capable headset, according to one or more embodiments. The features illustrated in FIGS. 6A-6C may be used in conjunction with other embodiments.

Referring to FIG. 6A, in diagram 600, the headset 110 and controller devices 115-1, 115-2 are in a first arrangement 620, in which the controller devices 115-1, 115-2 are removably attached to the headset 110. As shown, the first arrangement 620 is disposed on a console table 610 on a floor 615, and is disposed near a television 605 (one example of an external display 440).

In the first arrangement 620, the headset 110 is in a docked state 625. As shown, the headset 110 is oriented such that a camera, which has a forward-oriented field of view when the headset 110 is in a worn state, has a field of view that is generally oriented toward the user (e.g., when viewing the television 605). In this way, the camera is capable of visually detecting the controller devices 115-1, 115-2 as the user operates the controller devices 115-1, 115-2.

In some embodiments, the headset 110 may be connected to wall power when in the docked state 625, and may provide electrical power to charge the controller devices 115-1, 115-2. Additionally, in the docked state 625, the headset 110 may be communicatively coupled with the television 605 via the communicative connection 480, which may be wireline, wireless, etc.

Referring to FIG. 6B, in another arrangement 630, the headset 110 and the controller devices 115-1, 115-2 are individually docked with the docking device 425, which places the headset 110 in the docked state 625. In some embodiments, the docking device 425 may be connected to wall power, and may provide electrical power to charge the headset 110 and/or the controller devices 115-1, 115-2. Additionally, the headset 110 may be communicatively coupled with the television 605 directly via a communicative connection 480-1, or through the docking device 425 via a communicative connection 480-2.

Referring to FIG. 6C, in another arrangement 635, the controller devices 115-1, 115-2 are removably attached with the headset 110. In turn, the headset 110 is docked with the docking device 425, placing the headset 110 in the docked state 625. In some embodiments, the docking device 425 may be connected to wall power, and may provide electrical power to charge the headset 110 and/or the controller devices 115-1, 115-2. Additionally, the headset 110 may be communicatively coupled with the television 605 directly via the communicative connection 480-1, or through the docking device 425 via the communicative connection 480-2.

Figure 7:
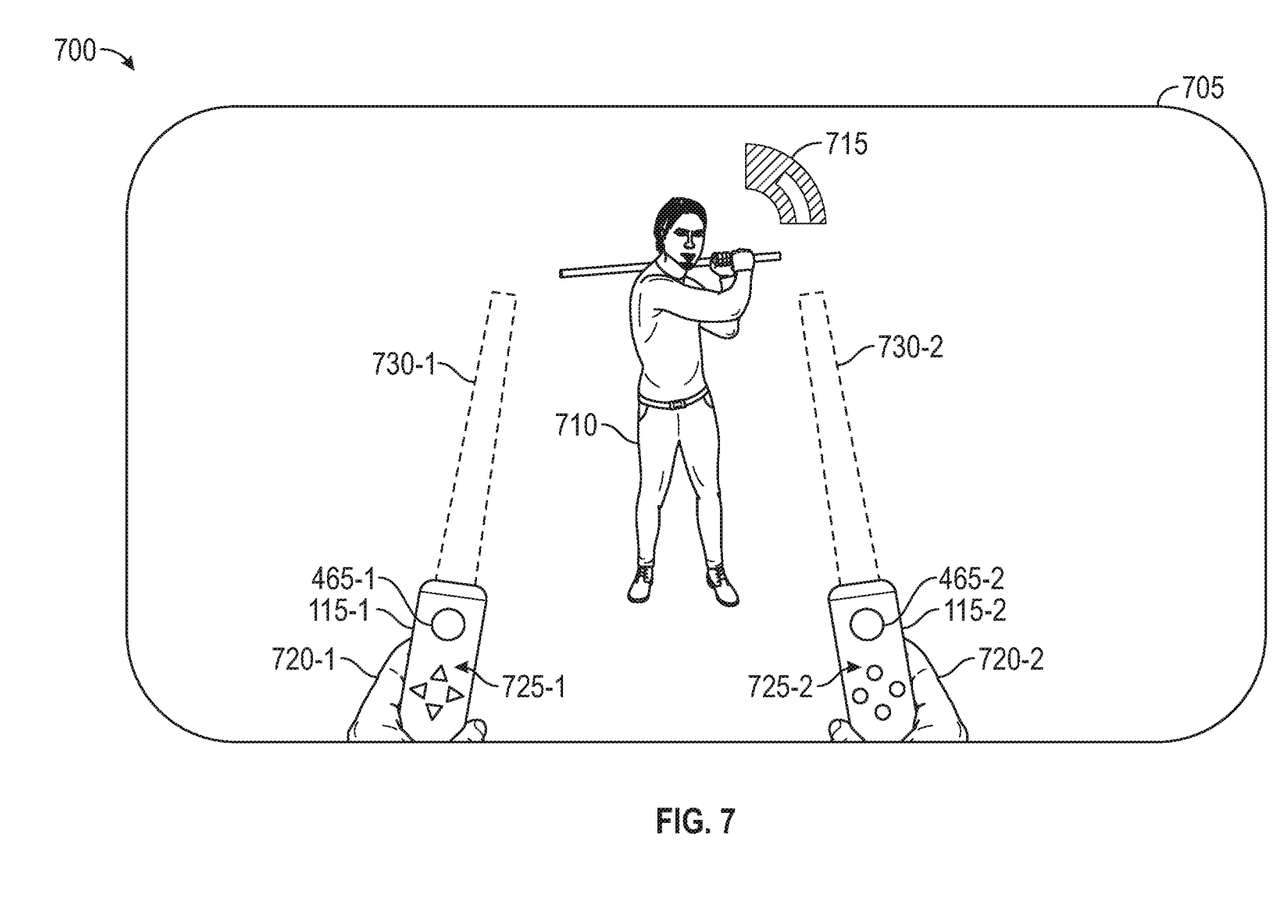
FIG. 7 illustrates an exemplary AR mode, according to one or more embodiments.

FIG. 7 illustrates an exemplary AR mode, according to one or more embodiments. More specifically, diagram 700 illustrates an AR mode displaying interactive virtual objects in three-dimensional space. The features illustrated in the diagram 700 may be used in conjunction with other embodiments, such as representing a view of a user when wearing the headset 110 illustrated in FIGS. 1 and 4.

Diagram 700 includes a view 705 that represents the field of view of the user when wearing an AR-capable headset. Within the view 705, visual content is generated by one or more computer processors to establish a scene. As shown, the view 705 includes a scene of virtual swordfighting, having a virtual opponent 710 and a virtual meter 715 indicating a virtual health of the virtual opponent 710.

The view 705 also includes portions of hands 720-1, 720-2 of the user, which are holding the controller devices 115-1, 115-2, respectively. Although not shown, the view 705 may further include other objects in the physical environment. The controller device 115-1 includes a visual reference feature 465-1 as well as buttons 725-1. The controller device 115-2 includes a visual reference feature 465-2 as well as buttons 725-2. The buttons 725-1, 725-2 may be pressed by the user to provide input to the one or more computer processors, e.g., to adapt the displayed visual content. The visual reference features 465-1, 465-2 are visually detected by one or more visual sensors of the headset. The positioning and/or movement of the controller devices 115-1, 115-2 may also be used to provide input to the one or more computer processors. Virtual blades 730-1, 730-2 are displayed in the view 705 and are positioned referenced to the visual reference features 465-1, 465-2. The virtual blades 730-1, 730-2 are positioned to appear to extend from the controller devices 115-1, 115-2, such that the controller devices 115-1, 115-2 appear to be handles for the user's virtual swords.

Figure 8:
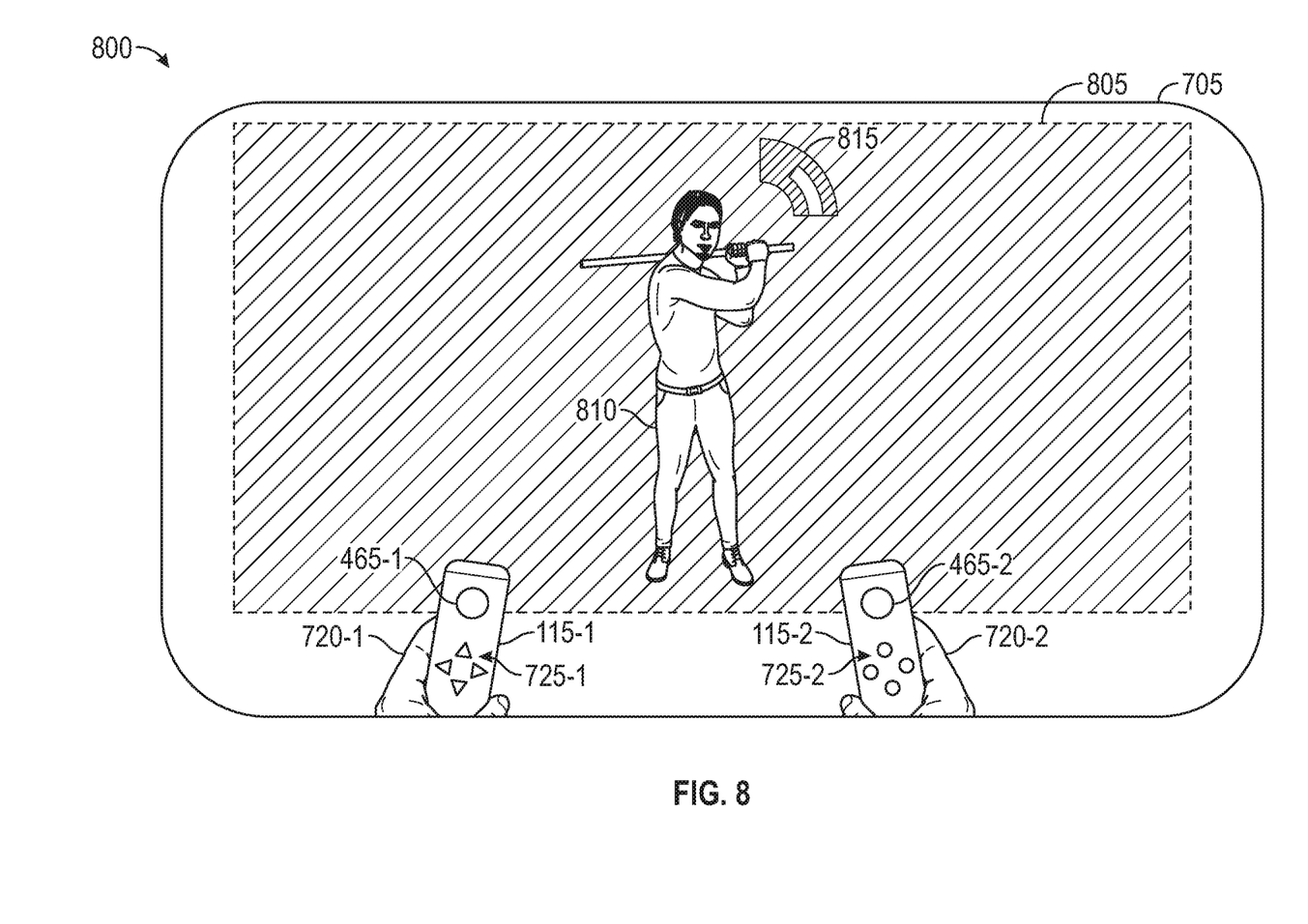
FIG. 8 illustrates an exemplary AR mode having a virtual two-dimensional display, according to one or more embodiments.

FIG. 8 illustrates an exemplary AR mode having a virtual two-dimensional display, according to one or more embodiments. More specifically, diagram 800 illustrates an AR mode displaying virtual objects on the virtual two-dimensional display. The features illustrated in the diagram 800 may be used in conjunction with other embodiments, such as representing a view of a user when wearing the headset 110 illustrated in FIGS. 1 and 4.

Within the view 705, a virtual character 810 and a virtual meter 815 are displayed on a virtual display 805. In some embodiments, the virtual display 805 is a two-dimensional display, e.g., having the appearance of a television or a computer monitor. In other embodiments, the virtual display 805 may display content using multiple virtual surfaces. The virtual display 805 may be sized to provide a larger display than an external display (e.g., to provide a more immersive experience for the user).

In the AR mode illustrated in the diagram 800, the buttons 725-1, 725-2 may be pressed by the user to provide input to the one or more computer processors, e.g., to adapt the displayed visual content. The positioning and/or movement of the controller devices 115-1, 115-2 may also be used to provide input to the one or more computer processors.

Figure 9:
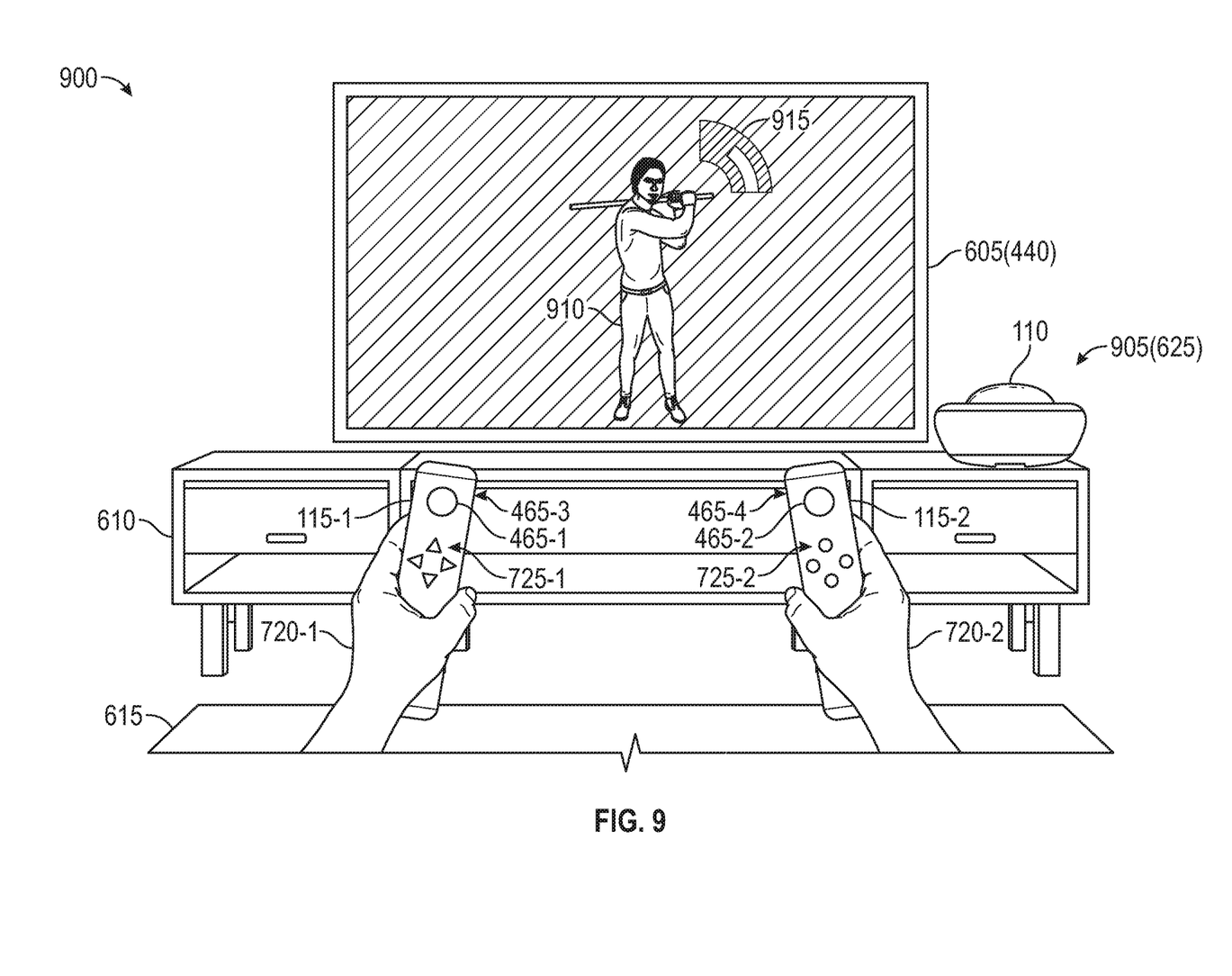
FIG. 9 illustrates an exemplary mode in which an unworn AR headset visually detects controller devices, according to one or more embodiments.

FIG. 9 illustrates an exemplary mode in which an unworn AR headset visually detects controller devices, according to one or more embodiments. The features illustrated in diagram 900 may be used in conjunction with other embodiments.

In the diagram 900, the headset 110 is in an arrangement 905 disposed on the console table 610 near the television 605. In the arrangement 905, the headset 110 is in a docked state 625. As shown, the headset 110 is oriented such that a camera, which has a forward-oriented field of view when the headset 110 is in a worn state, has a field of view that is generally oriented toward the user (e.g., when viewing the television 605). In this way, the camera is capable of visually detecting the controller devices 115-1, 115-2 as the user operates the controller devices 115-1, 115-2.

In some embodiments, the controller devices 115-1, 115-2 include visual reference features 465-3, 465-4, respectively, arranged on external surfaces of the controller devices 115-1, 115-2. As shown, the visual reference feature 465-1 is arranged on a first external surface of the controller device 115-1, and the visual reference feature 465-3 is arranged on a second external surface of the controller device 115-1 opposite the first external surface. The visual reference feature 465-2 is arranged on a third external surface of the controller device 115-2, and the visual reference feature 465-4 is arranged on a fourth external surface of the controller device 115-2 opposite the third external surface. Other arrangements of the visual references features 465-1, . . . , 465-4 are also contemplated.

In some embodiments, the headset 110 may be connected to wall power when in the docked state 625. Additionally, in the docked state 625, the headset 110 is communicatively coupled with the television 605. The visual content is provided from the headset 110 to the television 605. As shown, the visual content includes a virtual opponent 910 and a virtual meter 915.

In the mode illustrated in the diagram 900, the buttons 725-1, 725-2 may be pressed by the user to provide input to the one or more computer processors, e.g., to adapt the displayed visual content. The positioning and/or movement of the controller devices 115-1, 115-2 may also be used to provide input to the one or more computer processors.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
one or more controller devices; and
an augmented reality (AR)-capable headset comprising:
 one or more visual sensors; and
 one or more computer processors configured to, while the headset is in an unworn state:
  receive input from the one or more controller devices;
  output visual content to an external display; and
  visually detect the one or more controller devices using the one or more visual sensors.

2. The system of claim 1, wherein, in the unworn state, the headset has a substantially static orientation.

3. The system of claim 2,
wherein a docking device arranges the headset in the substantially static orientation, and
wherein the one or more computer processors are further configured to:
 determine whether the headset is docked with the docking device.

4. The system of claim 2, wherein the one or more visual sensors comprise a camera that has a forward-oriented field of view when the headset is in a worn state.

5. The system of claim 1, wherein the one or more computer processors are further configured to:
determine, using one or more sensor signals, whether the headset is in the unworn state.

6. The system of claim 1, wherein the one or more computer processors are further configured to, while the headset is out of the unworn state:
output the visual content to a display of the headset.

7. The system of claim 6, wherein the visual content comprises a virtual two-dimensional display.

8. The system of claim 1,
wherein the one or more controller devices are hand-held or body-worn, and
wherein the one or more computer processors are further configured to visually detect one or more visual reference features arranged on one or more external surfaces of the one or more controller devices.

9. An augmented reality (AR)-capable headset comprising:
one or more visual sensors; and
one or more computer processors configured to:
determine whether the headset is in an unworn state, wherein the headset has a substantially static orientation; and
while the headset is in the unworn state:
receive input from one or more controller devices;
output visual content to an external display; and
visually detect the one or more controller devices using the one or more visual sensors.

10. The headset of claim 9, wherein the one or more computer processors are further configured to determine whether the headset is docked with a docking device that arranges the headset with the substantially static orientation.

11. The headset of claim 9, wherein the one or more visual sensors comprise a camera that has a forward-oriented field of view when the headset is in a worn state.

12. The headset of claim 9, wherein the one or more computer processors are further configured to, while the headset is out of the unworn state:
output the visual content to a display of the headset.

13. The headset of claim 12, wherein the visual content comprises a virtual two-dimensional display.

14. The headset of claim 9,
wherein the one or more controller devices are hand-held or body-worn, and
wherein the one or more computer processors are further configured to visually detect one or more visual reference features arranged on one or more external surfaces of the one or more controller devices.

15. A method for use with an augmented reality (AR)-capable headset, the method comprising:
determining whether the headset is an unworn state, wherein the headset has a substantially static orientation; and
while the headset is in the unworn state:
receiving input from one or more controller devices;
outputting visual content to an external display; and
visually detecting the one or more controller devices using one or more visual sensors of the headset.

16. The method of claim 15, wherein determining whether the headset is the unworn state comprises:
determining whether the headset is docked with a docking device that arranges the headset with the substantially static orientation.

17. The method of claim 15, wherein the one or more visual sensors comprise a camera that has a forward-oriented field of view when the headset is in a worn state.

18. The method of claim 15, further comprising:
while the headset is in a worn state, output the visual content to a display of the headset.

19. The method of claim 18, wherein the visual content comprises a virtual two-dimensional display.

20. The method of claim 15,
wherein the one or more controller devices are hand-held or body-worn, and
wherein the visually detecting the one or more controller devices comprises visually detecting one or more visual reference features arranged on one or more external surfaces of the one or more controller devices.

* * * * *